US011429837B2

(12) United States Patent
Malhotra et al.

(10) Patent No.: US 11,429,837 B2
(45) Date of Patent: Aug. 30, 2022

(54) SPARSE NEURAL NETWORK BASED ANOMALY DETECTION IN MULTI-DIMENSIONAL TIME SERIES

(71) Applicant: Tata Consultancy Services Limited, Mumbai (IN)

(72) Inventors: Pankaj Malhotra, Noida (IN); Narendhar Gugulothu, Noida (IN); Lovekesh Vig, Gurgaon (IN); Gautam Shroff, Gurgaon (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 821 days.

(21) Appl. No.: 16/353,375

(22) Filed: Mar. 14, 2019

(65) Prior Publication Data

US 2020/0012918 A1 Jan. 9, 2020

(30) Foreign Application Priority Data

Jul. 9, 2018 (IN) .............................. 201821025602

(51) Int. Cl.
*G06N 3/04* (2006.01)
*G06N 3/08* (2006.01)

(52) U.S. Cl.
CPC ................. *G06N 3/04* (2013.01); *G06N 3/08* (2013.01)

(58) Field of Classification Search
CPC .......... G06N 3/04; G06N 3/08; G06N 3/0454; G06N 3/0445
See application file for complete search history.

(56) References Cited

U.S. PATENT DOCUMENTS

| 7,756,678 B2 | 7/2010 | Bonissone et al. |
| 10,311,704 B1 * | 6/2019 | Xu .............................. G06T 7/11 |

(Continued)

FOREIGN PATENT DOCUMENTS

JP    2011-145846    7/2011

OTHER PUBLICATIONS

Chong et al., "Abnormal Event Detection in Videos using Spatiotemporal Autoencoder", Jan. 6, 2017, arXiv:1701.01546v1, pp. 1-20. (Year: 2017).*

(Continued)

*Primary Examiner* — Ying Yu Chen
(74) *Attorney, Agent, or Firm* — Finnegan, Henderson, Farabow, Garrett & Dunner LLP

(57) ABSTRACT

Anomaly detection from time series is one of the key components in automated monitoring of one or more entities. Domain-driven sensor selection for anomaly detection is restricted by knowledge of important sensors to capture only a certain set of anomalies from the entire set of possible anomalies. Hence, existing anomaly detection approaches are not very effective for multi-dimensional time series. Embodiments of the present disclosure depict sparse neural network for anomaly detection in multi-dimensional time series (MDTS) corresponding to a plurality of parameters of entities. A reduced-dimensional time series is obtained from the MDTS via an at least one feedforward layer by using a dimensionality reduction model. The dimensionality reduction model and recurrent neural network (RNN) encoder-decoder model are simultaneously learned to obtain a multi-layered sparse neural network. A plurality of error vectors corresponding to at least one time instance of the MDTS is computed to obtain an anomaly score.

12 Claims, 8 Drawing Sheets

(56) References Cited

U.S. PATENT DOCUMENTS

| | | | |
|---|---|---|---|
| 2013/0289904 A1 | 10/2013 | Marwah et al. | |
| 2016/0299938 A1* | 10/2016 | Malhotra | G06N 3/0445 |
| 2018/0027004 A1 | 1/2018 | Huang et al. | |
| 2018/0275642 A1* | 9/2018 | Tajima | G05B 23/0254 |
| 2019/0130659 A1* | 5/2019 | Ide | G07C 5/006 |
| 2019/0228110 A1* | 7/2019 | Yan | H04L 63/1425 |
| 2020/0005096 A1* | 1/2020 | Calmon | G06N 20/10 |

OTHER PUBLICATIONS

Wen et al., "Learning Structured Sparsity in Deep Neural Networks", Oct. 18, 2016, arXiv:1608.03665v4, pp. 1-10. (Year: 2016).*
Deng et al., "Image-to-Markup Generation with Coarse-to-Fine Attention", Aug. 6, 2017. Proceedings of the 34 th International Conference on Machine Learning, Sydney, Australia, PMLR 70, pp. 1-10. (Year: 2017).*

\* cited by examiner

SPARSE NEURAL NETWORK BASED ANOMALY DETECTION IN MULTI-DIMENSIONAL TIME SERIES

PRIORITY CLAIM

This U.S. patent application claims priority under 35 U.S.C. § 119 to: India Application No. 201821025602, filed on Jul. 9, 2018. The entire contents of the aforementioned application are incorporated herein by reference.

TECHNICAL FIELD

The disclosure herein generally relates to time series analysis, and, more particularly, to systems and methods for anomaly detection in multi-dimensional time series based on Sparse neural network.

BACKGROUND

In the current Digital Era, streaming data is ubiquitous and growing at a rapid pace, enabling automated monitoring of systems, e.g. using Industrial Internet of Things with large number of sensors capturing the operational behavior of an equipment. Complex industrial systems such as engines, turbines, aircrafts, etc., are typically instrumented with a large number (tens or even hundreds) of sensors resulting in multi-dimensional streaming data. There is a growing interest among original equipment manufacturers (OEMs) to leverage this data to provide remote health monitoring services and help field engineers take informed decisions.

Anomaly detection from time series is one of the key components in building any health monitoring system. For example, detecting early symptoms of an impending fault in a machine in form of anomalies can help take corrective measures to avoid the fault or reduce maintenance cost and machine downtime. Recently, Recurrent Neural Networks (RNNs) have found extensive applications for anomaly detection in multivariate time series by building a model of normal behavior of complex systems from multi-sensor data, and then flagging deviations from the learned normal behavior as anomalies. Consequently, the notion of finding meaningful anomalies becomes substantially more complex in multi-dimensional data.

Domain-driven sensor selection for anomaly detection using RNNs is restricted by the knowledge of important sensors to capture a given set of anomalies, and would therefore miss other types of anomalous signatures in any sensor not included in the set of relevant sensors. Similarly, approaches considering each sensor or a subset of sensors independently to handle such scenarios may not be appropriate given that: a) it leads to loss of useful sensor-dependency information, and b) when the number of sensors is large, building and deploying a separate RNN model for each sensor may be impractical and computationally infeasible. However, existing anomaly detection approaches are not very effective for multi-dimensional time series.

SUMMARY

Embodiments of the present disclosure present technological improvements as solutions to one or more of the above-mentioned technical problems recognized by the inventors in conventional systems. For example, in one aspect, a processor implemented method for detecting anomaly in multi-dimensional time series based on sparse neural network is provided. The method comprises receiving, at an input layer, a multi-dimensional time series corresponding to a plurality of parameters of an entity; obtaining, using a dimensionality reduction model, a reduced-dimensional time series from the multi-dimensional time series via an at least one feedforward layer, wherein connections between the input layer and the feedforward layer are sparse to access at least a portion of the plurality of parameters; estimating, by using a recurrent neural network (RNN) encoder-decoder model, the multi-dimensional time series using the reduced-dimensional time series obtained by the dimensionality reduction model; simultaneously learning, by using the estimated multi-dimensional time series, the dimensionality reduction model and the RNN encoder-decoder model to obtain a multi-layered sparse neural network; computing, by using the multi-layered sparse neural network, a plurality of error vectors corresponding to at least one time instance of the multi-dimensional time series by performing a comparison of the multi-dimensional time series and the estimated multi-dimensional time series; and generating at least one anomaly score based on the plurality of the error vectors.

In an embodiment, each of the plurality of parameters in the reduced-dimensional time series is a non-linear function of a subset of the plurality of parameters of the multi-dimensional time series. The dimensionality reduction model includes a plurality of feedforward layers with Least Absolute Shrinkage and Selection Operator (LASSO) sparsity constraint on plurality of parameters of the feedforward layers. The method may further comprise classifying at least one time instance in the multi-dimensional time series as anomalous if the anomaly score is greater than a threshold (e.g., a dynamic threshold). The method may further comprise classifying at least one time instance in the multi-dimensional time series as normal if the anomaly score is less than or equal to the threshold. The threshold may be learned based on a hold-out validation set while maximizing F-score. The hold-out validation set comprises at least one normal time instance and at least one anomalous time instance of the multi-dimensional time series.

In another aspect, there is provided a processor implemented system for detecting anomaly in multi-dimensional time series based on sparse neural network. The system comprises: a memory storing instructions; one or more communication interfaces; and one or more hardware processors coupled to the memory via the one or more communication interfaces, wherein the one or more hardware processors are configured by the instructions to: receive, at an input layer, a multi-dimensional time series corresponding to a plurality of parameters of an entity; obtain, using a dimensionality reduction model, a reduced-dimensional time series from the multi-dimensional time series via an at least one feedforward layer, wherein connections between the input layer and the feedforward layer are sparse to access at least a portion of the plurality of parameters; estimate, by using a recurrent neural network (RNN) encoder-decoder model, the multi-dimensional time series using the reduced-dimensional time series obtained by the dimensionality reduction model; simultaneously learn, by using the estimated multi-dimensional time series, the dimensionality reduction model and the RNN encoder-decoder model to obtain a multi-layered sparse neural network; compute, by using the multi-layered sparse neural network, a plurality of error vectors corresponding to at least one time instance of the multi-dimensional time series by performing a comparison of the multi-dimensional time series and the estimated multi-dimensional time series; and generate at least one anomaly score based on the plurality of the error vectors.

In an embodiment, each of the plurality of parameters in the reduced-dimensional time series is a non-linear function of a subset of the plurality of parameters of the multi-dimensional time series. In an embodiment, the dimensionality reduction model includes a plurality of feedforward layers with Least Absolute Shrinkage and Selection Operator (LASSO) sparsity constraint on plurality of parameters of the feedforward layers. In an embodiment, the one or more hardware processors are further configured to: classify at least one time instance in the multi-dimensional time series as anomalous if the anomaly score is greater than a threshold (e.g., a dynamic threshold) and classify at least one time instance in the multi-dimensional time series as normal if the anomaly score is less than or equal to the threshold. The threshold may be learned based on a hold-out validation set while maximizing for F-score. The hold-out validation set may comprise at least one normal time instance and at least one anomalous time instance of the multi-dimensional time series.

In yet another aspect, there are provided one or more non-transitory machine readable information storage mediums comprising one or more instructions which when executed by one or more hardware processors causes receiving, at an input layer, a multi-dimensional time series corresponding to a plurality of parameters of an entity; obtaining, using a dimensionality reduction model, a reduced-dimensional time series from the multi-dimensional time series via an at least one feedforward layer, wherein connections between the input layer and the feedforward layer are sparse to access at least a portion of the plurality of parameters; estimating, by using a recurrent neural network (RNN) encoder-decoder model, the multi-dimensional time series using the reduced-dimensional time series obtained by the dimensionality reduction model; simultaneously learning, by using the estimated multi-dimensional time series, the dimensionality reduction model and the RNN encoder-decoder model to obtain a multi-layered sparse neural network; computing, by using the multi-layered sparse neural network, a plurality of error vectors corresponding to at least one time instance of the multi-dimensional time series by performing a comparison of the multi-dimensional time series and the estimated multi-dimensional time series; and generating at least one anomaly score based on the plurality of the error vectors.

In an embodiment, the instructions when executed by the one or more hardware processors may further cause each of the plurality of parameters in the reduced-dimensional time series to be a non-linear function of a subset of the plurality of parameters of the multi-dimensional time series. The dimensionality reduction model includes a plurality of feedforward layers with Least Absolute Shrinkage and Selection Operator (LASSO) sparsity constraint on plurality of parameters of the feedforward layers. The method may further comprise classifying at least one time instance in the multi-dimensional time series as anomalous if the anomaly score is greater than a threshold (e.g., a dynamic threshold). The method may further comprise classifying at least one time instance in the multi-dimensional time series as normal if the anomaly score is less than or equal to the threshold. The threshold (e.g., a dynamic threshold) may be learned based on a hold-out validation set while maximizing for F-score. The hold-out validation set may comprise at least one normal time instance and at least one anomalous time instance of the multi-dimensional time series.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
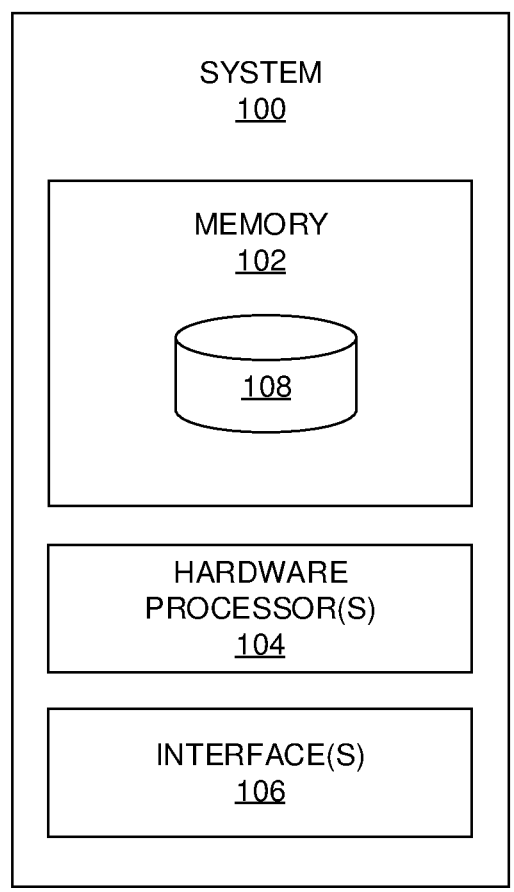
FIG. 1 illustrates an exemplary block diagram of a system for detecting anomaly in multi-dimensional time series based on sparse neural network in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In the present disclosure, embodiments and systems and methods associated thereof provide an efficient way for extension to such approaches for multi-dimensional time series. The present approach combines advantages of non-temporal dimensionality reduction techniques and recurrent autoencoders for time series modeling through an end-to-end learning framework. The recurrent encoder gets sparse access to the input dimensions via a feedforward layer while the recurrent decoder is forced to reconstruct all the input dimensions, thereby leading to better regularization and a robust temporal model. The autoencoder thus trained on normal time series is likely to give a high reconstruction error, and a corresponding high anomaly score, for any anomalous time series pattern.

The present disclosure proposes Sparse Neural Network based Anomaly Detection, or (SPREAD): an approach that combines the point-wise (i.e. non-temporal) dimensionality reduction via one or more sparsely connected feedforward layers over the input layer with a recurrent neural encoder-decoder in an end-to-end learning setting to model the normal behavior of a system. Once a model for normal behavior is learned, it can be used for detecting behavior deviating from normal by analyzing the reconstruction via a recurrent decoder that attempts to reconstruct the original time series back using output of the recurrent encoder. Having been trained only on normal data, the model is likely to fail in reconstructing an anomalous time series and result in high reconstruction error. This error in reconstruction is used to obtain an anomaly score.

In the present disclosure, further efficacy with significant improvement is observed by implementation of the proposed approach through experiments on a public dataset and two real-world datasets in anomaly detection performance over several baselines. The proposed approach is able to perform well even without knowledge of relevant dimensions carrying the anomalous signature in a multi-dimensional setting. The present disclosure further proposes an effective way to leverage sparse networks via $L_1$ regularization for anomaly detection in multi-dimensional time series.

Referring now to the drawings, and more particularly to FIG. 1 through FIG. 4A-4C, where similar reference characters denote corresponding features consistently throughout the figures, there are shown preferred embodiments and these embodiments are described in the context of the following exemplary system and/or method.

FIG. 1 illustrates an exemplary block diagram of a system 100 for detecting anomaly in multi-dimensional time series based on sparse neural network in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The memory 102 comprises a database 108. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The database 108 may store information but are not limited to, a plurality of parameters obtained from one or more sensors, wherein the parameters are specific to an entity (e.g., user, machine, and the like). In an embodiment, one or more sensors may be a temperature sensor, a motion sensor, a pressure sensor, a vibration sensor and the like. Parameters may comprise sensor data captured through the sensors either connected to the user and/or machine. Further, the database 108 stores information pertaining to inputs fed to the system 100 and/or outputs generated by the system (e.g., at each stage), specific to the methodology described herein. More specifically, the database 108 stores information being processed at each step of the proposed methodology.

Figure 2:
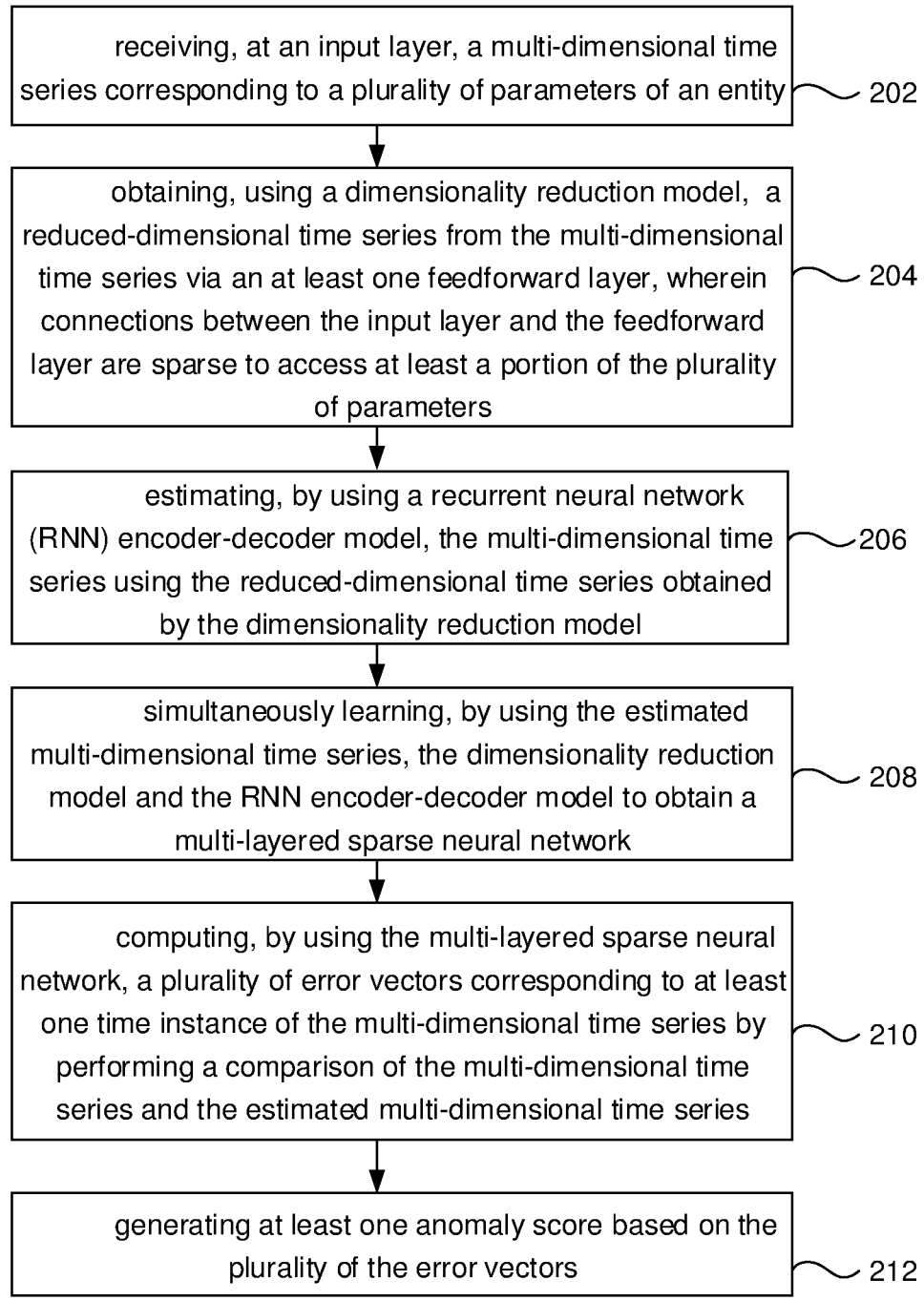
FIG. 2 illustrates an exemplary flow diagram illustrating a method for detecting anomaly in multi-dimensional time series based on sparse neural network using the system of FIG. 1 according to an embodiment of the present disclosure.

FIG. 2, with reference to FIG. 1, illustrates an exemplary flow diagram illustrating a method for detecting anomaly in multi-dimensional time series based on sparse neural network using the system 100 of FIG. 1 according to an embodiment of the present disclosure. In an embodiment, the system 100 comprises one or more data storage devices or the memory 102 operatively coupled to the one or more hardware processors 104 and is configured to store instructions for execution of steps of the method by the one or more processors 104. The flow diagram depicted in FIG. 2 is better understood by way of following explanation/description.

Figure 3A:
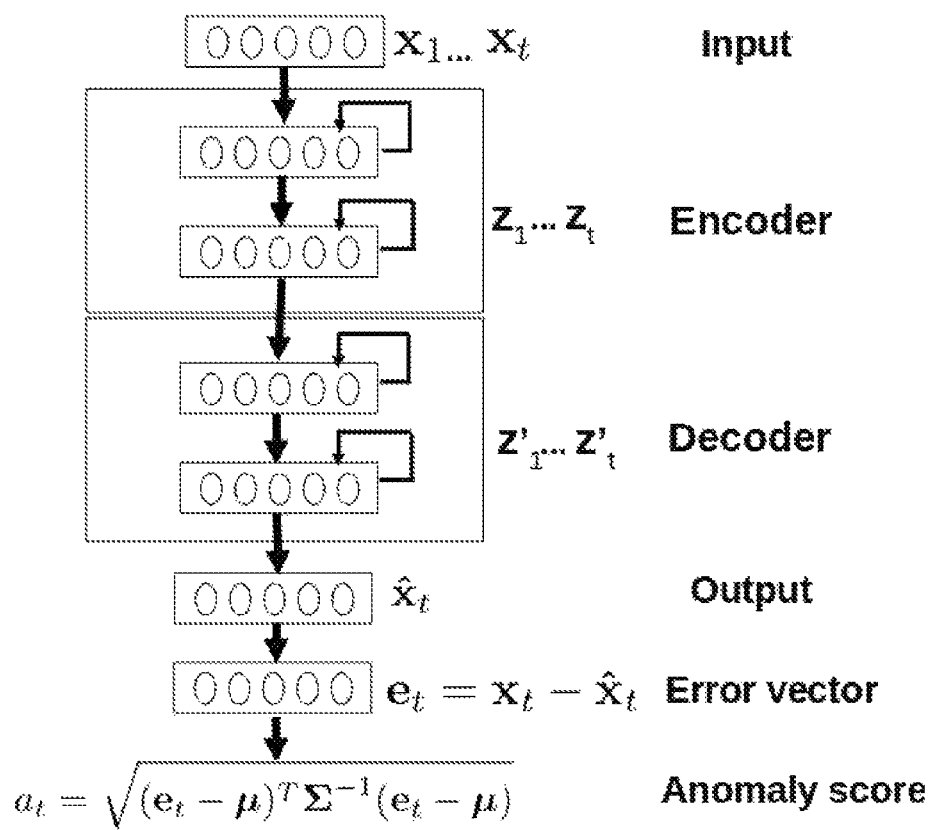
FIG. 3A depicts a Standard Recurrent Neural Network (RNN) Encoder-Decoder.

An RNN based Encoder-decoder anomaly detection (EncDec-AD) as shown in FIG. 3A first trains a recurrent neural network encoder-decoder (RNN-ED) as a temporal autoencoder using reconstruction error as a loss function. The autoencoder is trained on normal time series such that the network learns to reconstruct a normal time series well but is likely not to reconstruct an anomalous time series. The reconstruction error is then used to obtain an anomaly score.

Figure 3B:
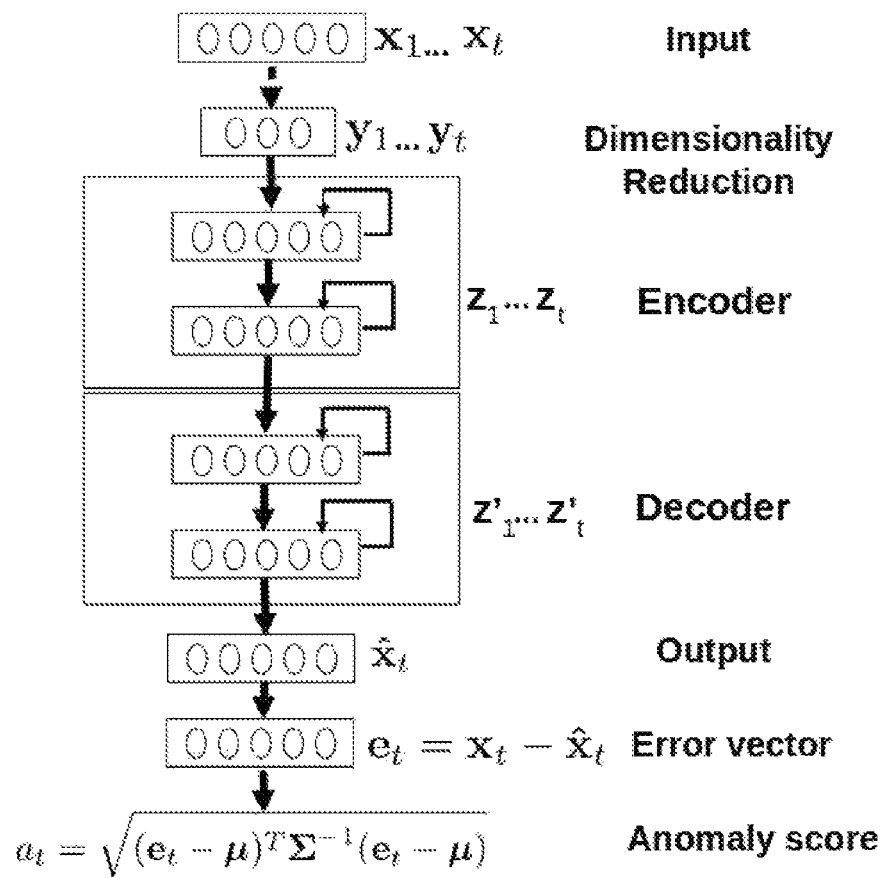
FIG. 3B depicts a Sparse Neural Network based anomaly detection as implemented by the system 100 of FIG. 1 in accordance with some embodiments of the present disclosure.
Figure 3C:
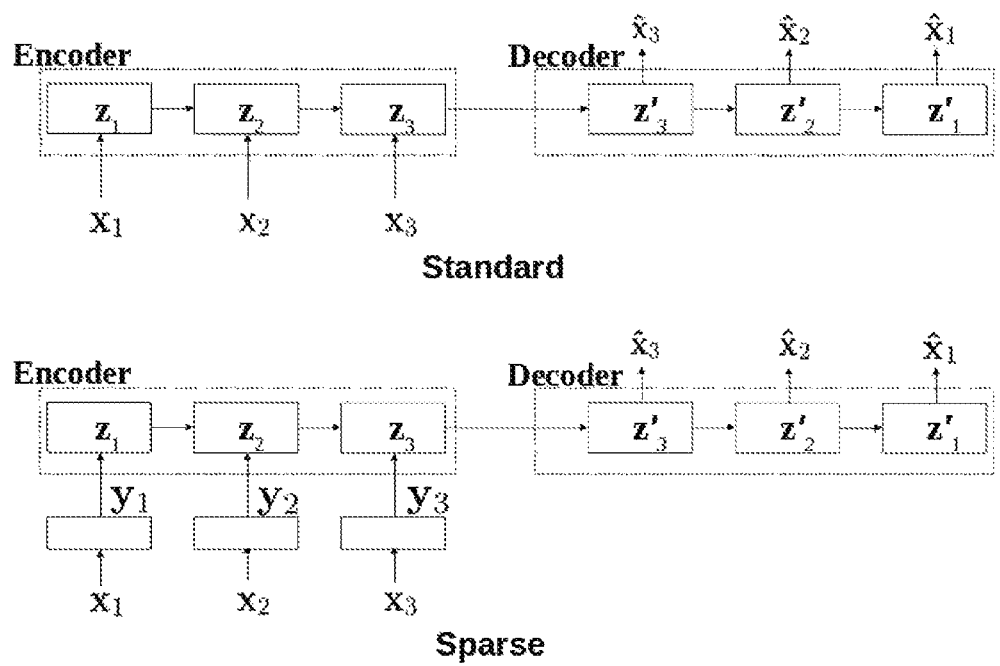
FIG. 3C depicts a comparison between the Standard RNN Encoder-Decoder and the Sparse Neural Network in accordance with some embodiments of the present disclosure.

More specifically, FIG. 3B, with reference to FIGS. 1 through 2, depict sparse neural network encoder-decoder based anomaly detection as implemented by the system 100 of FIG. 1 in accordance with some embodiments of the present disclosure. More specifically, Recurrent neural network Encoded-decoder (RNN-ED) is trained in such a manner that the target time series $x_{T\ldots 1}^{(i)}$ is reverse of the input time series $x^{(i)} = x_{1\ldots T}^{(i)}$, for ith time series instance. In an embodiment, $x_{1\ldots T}$ denote a multivariate real-valued time series $x_1, x_2, \ldots, x_T$ of length T where each $x_t \in \mathbb{R}^d$, (d being the input dimension, e.g. number of sensors in our case). The overall process can be thought of as a non-linear mapping of the input multivariate time series to a fixed-dimensional vector $z_T^{(i)}$ via an encoder function $f_E$, followed by another non-linear mapping of the fixed-dimensional vector to a multivariate time series via a decoder function $f_D$. RNN-ED is trained to minimize the loss function L given by the average of squared reconstruction error:

$$z_T^{(i)} = f_E(x^{(i)}; W_E) \quad (1)$$

$$\hat{x}^{(i)} = f_D(z_T^{(i)}; W_D)$$

$$e_t^{(i)} = x_t^{(i)} - \hat{x}_i^t, t = 1 \ldots T$$

$$C_1(\hat{x}^{(i)}, x^{(i)}) = \frac{1}{T}\sum_{t=1}^{T} \|e_t^{(i)}\|_2^2$$

$$L = \frac{1}{N}\sum_{i=1}^{N} C_1(\hat{x}^{(i)}, x^{(i)})$$

where, N is the number of multivariate time series instances in training set, $\|.\|_2$ denotes $L_2$-norm, and $W_E$ and $W_D$ represent the parameters of the encoder and decoder RNNs, respectively.

Given the error vector $e_t^{(i)}$, Mahalanobis distance is used to compute the anomaly score $a_t^{(i)}$ as follows:

$$a_t^{(i)} = \sqrt{(e_t^{(i)}-\mu)^T \Sigma^{-1}(e_t^{(i)}-\mu)} \quad (2)$$

where $\mu$ and $\Sigma$ are the mean and covariance matrix of the error vectors corresponding to the normal training time series instances. This anomaly score can be obtained in an online setting by using a window of length T ending at current time t as the input, making it possible to generate timely alarms related to anomalous behavior. A point $x_t^{(i)}$ is classified as anomalous if $a_t^{(i)} > \tau$; the threshold $\tau$ can be learned using a hold-out validation set while optimizing for F-score.

The steps of the method of the present disclosure will now be explained with reference to the components of the system 100 as depicted in FIG. 1, and the flow diagram of FIG. 2. In an embodiment of the present disclosure, at step 202, the one or more hardware processors 104 receive, at an input layer, a multi-dimensional time series corresponding to a plurality of parameters of an entity (e.g., in this case entity can be a user, or a machine, and the like). In an embodiment, each dimension of the multi-dimensional time series corresponds to at least one parameter from the plurality of parameters of the entity. In an embodiment of the present disclosure, at step 204, the one or more hardware processors 104 obtain, using a dimensionality reduction model, a reduced-dimensional time series from the multi-dimensional time series via an at least one feedforward layer. In one embodiment, connections between the input layer and the feedforward layer are sparse to access at least a portion of the plurality of parameters. In one embodiment, a provision for mapping each multi-dimensional point in the input time series to a reduced-dimensional point via a feedforward dimensionality reduction layer, and then use the time series in reduced-dimensional space to reconstruct the original multi-dimensional time series via RNN-ED, as in EncDec-AD.

A sparsity constraint is added on the weights of the feedforward layer such that each unit in the feedforward layer has access to a subset of the input parameters (e.g., input dimensions). A feedforward layer with sparse connections $W_R$ from the input layer is used to map $x_t^{(i)} \in \mathbb{R}^d$ to $y_t^{(i)} \in \mathbb{R}^r$, such that $r < d$, through a non-linear transformation via Rectified Linear Units (ReLU). The transformed lower-dimensional input $y_t^{(i)}$ is then used as input to the RNN-ED network instead of $x_t^{(i)}$ modifying the steps in Equation (1) as follows:

$$y_t^{(i)} = ReLU(W_R \cdot x_t^{(i)}), t = 1 \ldots T$$

$$z_T^{(i)} = f_E(y^{(i)}; W_E)$$

$$\hat{x}^{(i)} = f_D(z_T^{(i)}; W_D)$$

$$W^* = \arg\min_W L + \frac{\lambda}{d \cdot r} \|W_R\|_1$$

where, $W = \{W_R, W_E, W_D\}$, ReLU $(x) = \text{Max}(x, 0) \cdot L_1$-norm $\|W_R\|_1 = \Sigma_j |w_j|$ (where $w_j$ is an element of matrix $W_R$) is the LASSO penalty employed to induce sparsity in the dimensionality reduction layer, i.e., constrain a fraction of the elements of $W_R$ to be close to 0 (controlled via the parameter $\lambda$). This converts a dense, fully-connected feedforward layer to a sparse layer. The sparse feedforward layer and the RNN-ED are trained in an end-to-end manner via stochastic gradient descent.

$$\frac{\partial \|W_R\|}{\partial w_i} = \text{sign}(w_i), w_i \neq 0,$$

where $w_i$ is an element of matrix $W_R$. In an embodiment, the training means here learning the outputs of each stage/step (202-208) as in FIG. 2. As $L_1$-norm is not differentiable at 0, the subgradient 0 is used in practice. In one embodiment, the dimensionality reduction model includes the plurality of feedforward layers with LASSO sparsity constraint. For example, each of the parameters in the reduced-dimensional time series is a non-linear function of a subset of the multi-dimensional time series.

The resulting sparse weight matrix $W_R$ ensures that the connections between the input layer and the feedforward layer are sparse such that each unit in the feedforward layer potentially has access to only a few of the input dimensions. Therefore, each dimension of $y_t^{(i)}$ is a linear combination of a relatively small number of input dimensions, effectively resulting in unsupervised feature selection.

In an embodiment of the present disclosure, at step 206, the one or more hardware processors 104 estimate, via the recurrent neural network (RNN) encoder-decoder model, the multi-dimensional time series using the reduced-dimensional time series obtained by the dimensionality reduction model as illustrated in FIG. 3B. More specifically, FIG. 3B, with reference to FIGS. 1 through 3A, depicts a recurrent neural network encoder-decoder (RNN-ED) model implemented by the system 100 of FIG. 1 in accordance with some embodiments of the present disclosure. In one embodiment even though the ReLU layer implies dimensionality reduction, the autoencoder is trained to reconstruct the original time series itself. In one embodiment, the sparse feedforward layer acts as a strong regularizer such that the reduced dimensions in the ReLU layer are forced to capture the information relevant to reconstruct all the original input dimensions.

In an embodiment of the present disclosure, at step 208, the one or more hardware processors 104 simultaneously learn, by using the estimated multi-dimensional time series, the dimensionality reduction model and the RNN encoder-decoder model to obtain a multi-layered sparse neural network. In an embodiment, the learning encompasses inputs and outputs at each step/stage (202-208) as in FIG. 2. In an embodiment of the present disclosure, at step 210, the one or more hardware processors 104 compute, by the multi-layered sparse neural network, a plurality of error vectors corresponding to at least one time instant of the multi-dimensional time series by performing a comparison of the multi-dimensional time series and the estimated multi-dimensional time series. In an embodiment of the present disclosure, at step 212, the one or more hardware processors 104 generate a one or more anomaly score based on the plurality of the error vectors. In an embodiment, an anomaly score is computed once the system 100 is trained. In an embodiment, each of the plurality of parameters in the reduced-dimensional time series is a non-linear function of a subset of the plurality of parameters of the multi-dimensional time series.

In another embodiment, the dimensionality reduction model comprises a plurality of feedforward layers with Least Absolute Shrinkage and Selection Operator (LASSO) sparsity constraint on plurality of parameters of the feedforward layers. In an embodiment, this approach further includes the step of classifying at least one time instance in the multi-dimensional time series as anomalous if the anomaly score is greater than a threshold. In an embodiment, this approach further includes the step of classifying at least one time instance in the multi-dimensional time series as normal if the anomaly score is less than or equal to the threshold. In an embodiment, F-score corresponding to a binary classifier with two classes i.e. a normal class (0) and an anomalous class (1).

In one embodiment, this ensures that the anomaly scores are still interpretable as contribution of each original dimension to the anomaly score can be estimated. In another embodiment, RNN-ED ensures that the temporal dependencies are well captured in the network while the sparse feedforward layer ensures that the dependencies between various dimensions at any given time are well captured.

Experimental Evaluation

Exemplary Approaches considered for comparison:

In the present disclosure, the sparse neural network encoder-decoder (SPREAD) may be compared with standard EncDec-AD (i.e. hereinafter referred as AD). The other approaches used for comparison are:

i. A simple non-temporal anomaly detection model, namely MD, based on Mahalanobis Distance in the multi-dimensional input space using $\mu$ and $\Sigma$ of the original point-wise inputs from the train instances (similar to the equation 2 where $x_t$ is used instead of $e_t$ to get the anomaly score).

ii. Relevant-AD where AD model is trained only on the most relevant parameters sufficient to determine the anomalous behavior or fault (as suggested by domain experts). This is used to evaluate the efficacy of SPREAD in being able to detect weak anomaly signatures present in only a small subset of the large number of input sensors.

iii. To compare implicit dimensionality reduction in SPREAD via end-to-end learning with standard dimensionality reduction techniques, PCA-AD is considered, where Principal Components Analysis (PCA) is first used to reduce the dimension of input being fed to AD (considering top principal components capturing 95% of the variance in data).

iv. To evaluate the effect of sparse connections in the feedforward layer with LASSO sparsity constraint, FF-AD (feedforward EncDec-AD) model is considered which is effectively SPREAD without the $L_1$ regularization (i.e. $\lambda=0$).

v. For performance evaluation, each point in a time series is provided ground truth as 0 (normal) or 1 (anomalous). Anomaly score is obtained for each point in an online manner, and Area under Receiver Operating Characteristic curve (AUROC) (obtained by varying the threshold $\tau$) is used as a performance metric.

Datasets Considered

The system and method of the present disclosure utilized three multi-sensor time series datasets as summarized in Table 4 for the experiments: i) GHL: a publicly available Gasoil Heating Loop dataset, ii) Turbomachinery: a real-world turbomachinery dataset, and iii) Pulverizer: a real-world pulverizer dataset. Anomalies in GHL dataset correspond to cyber-attacks on the system, while anomalies in Turbomachinery and Pulverizer dataset correspond to faulty behavior of system. Each dataset was divided into train, validation and test sets—whereas the train and validation sets contained only normal time series, the test set contained normal as well as anomalous time series.

Datasets Information

GHL: GHL dataset contained data for normal operations of a gasoil plant heating loop, and faulty behavior (due to cyber-attacks) in a plant induced by changing the control logic of the loop. There were 14 main variables and 5 auxiliary variables: considering 14 main variables, utilized fault IDs 25-48, and utilized Danger sensor as ground truth (1: Anomalous, 0: Normal). The original time-series was downsampled by 4 for computational efficiency using 4-point average, and a window of 100 points was taken (or considered) to generate time-series instances.

Turbomachinery: This was a real-world dataset with per minute sensor readings from 56 sensors, recorded for 4 days of operation with faulty signature being present for 1 hour before a forced shutdown. The sensors considered include temperature, pressure, control sensors, etc. belonging to different components of the machine. Out of these 56 sensors, the fault first appeared in only 2 sensors. Eventually, few other sensors also started showing anomalous behavior.

Pulverizer: Pulverizer was a real-world dataset obtained from a pulverizer mill with per-minute sensor readings from 35 sensors. This dataset had sensor readings of 45 days of operation, and symptoms of fault start appearing intermittently for 12 hours before forced shutdown. The sensors considered include temperature, differential pressure, load, etc. belonging to different components of the machine. This dataset had 3 relevant sensors sufficient to identify the anomalous behavior.

Training Details

TABLE 4

Details of datasets.

| Dataset | T | d | $d_r$ | p | $n_f$ | $n_a$ | n |
|---|---|---|---|---|---|---|---|
| GHL | 100 | 14 | 1 | 9 | 24 | 8,564 | 32,204 |
| Turbomachinery | 20 | 56 | 2 | 10 | 2 | 57 | 4353 |
| Pulverizer | 60 | 35 | 3 | 13 | 1 | 443 | 16,344 |

Here T: window length,
d: no. of sensors,
$d_r$: no. of relevant sensors for anomaly,
p: no. of principal components,
$n_f$: no. of faults,
$n_a$: no. of anomalous points,
n: no. of windows.

The system and method utilizes Adam optimizer for optimizing the weights of the networks with initial learning rate of 0.0005 for all experiments. The system and method utilizes architecture as the one with least reconstruction error on the holdout validation set containing only normal time series via grid search on following hyper-parameters: number of recurrent layers in RNN encoder and decoder L={1, 2, 3}, number of hidden units per layer in the range of 50-250 in steps of 50, and number of units $$r = \left\{ \frac{d}{4}, \frac{d}{2} \right\}$$

in the feedforward layer. The system and method utilizes $\lambda=0.01$ for SPREAD, and dropout rate of 0.25 in feedforward connections in encoder and decoder for regularization.

TABLE 1

Performance Comparison of Anomaly Detection Models in terms of AUROC. AD refers to EncDec-AD. With reference to the FIG. 4A-4C, FPR corresponds to false positive rate lies in X-axis and TPR corresponds to True positive rate lies in Y-axis.

| Dataset | Relevant-AD (402A-C) | MD (404A-C) | PCA-AD (406A-C) | AD (408A-C) | FF-AD (410A-C) | SPREAD (412A-C) |
|---|---|---|---|---|---|---|
| GHL | 0.944 | 0.692 | 0.903 | 0.974 | 0.962 | 0.977 |
| Turbo-machinery | 0.981 | 0.903 | 0.688 | 0.878 | 0.879 | 0.945 |
| Pulverizer | 0.882 | 0.812 | 0.757 | 0.953 | 0.966 | 0.964 |

TABLE 2

Sparsity Factors

| Approach | GHL | Turbomachinery | Pulverizer |
|---|---|---|---|
| FF-AD ($\lambda = 0$) | 0.041 | 0.045 | 0.074 |
| SPREAD ($\lambda = 0.01$) | 0.491 | 0.310 | 0.581 |

TABLE 3

Turbomachinery: Effect of treating sensors independently

| Sensor | $R_1$ | $R_2$ | $R_1$ & $R_2$ |
|---|---|---|---|
| AUROC | 0.888 | 0.922 | 0.981 |

Results and Observations

Figure 4A:
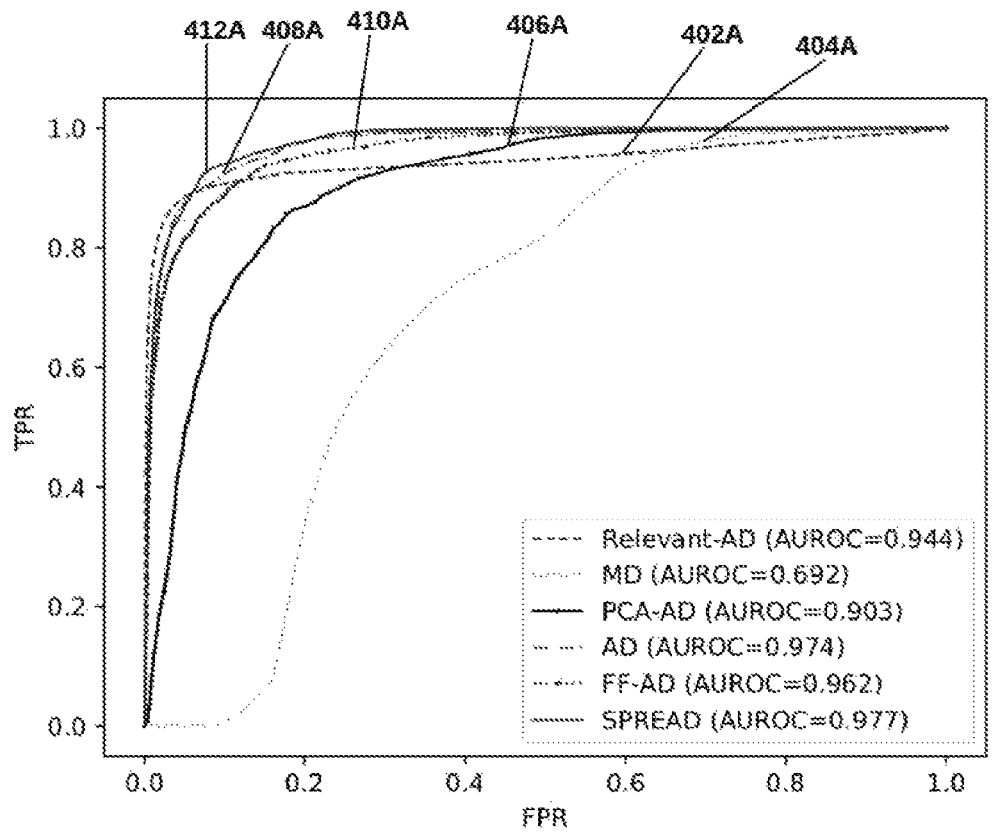
FIGS. 4A, 4B, and 4C depict a graphical representation illustrating Performance Comparison of Anomaly Detection Models in terms of AUROC in accordance with an exemplary embodiment of the present disclosure.
Figure 4B:
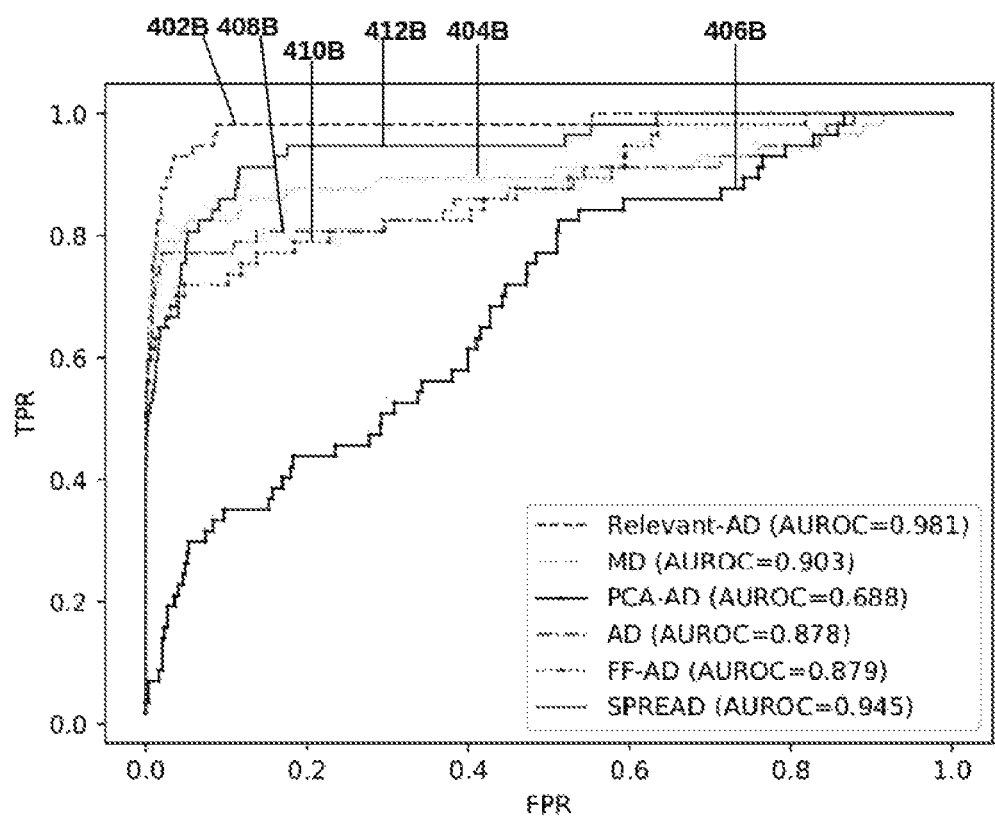
Figure 4C:
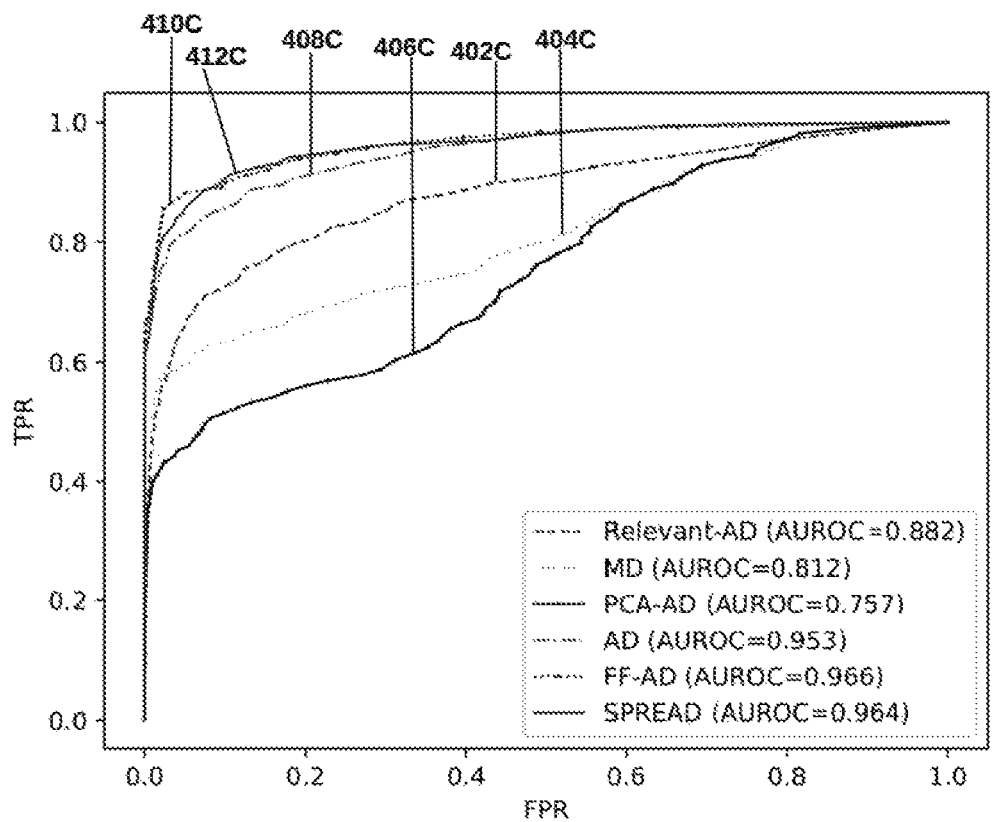

The following key observations from the results in Table 1 and a graphical representation illustrating Performance Comparison of Anomaly Detection Models in terms of AUROC in FIG. 4A-4C:

i. The non-temporal MD approach performs poorly across datasets highlighting the temporal nature of anomalies, and therefore, the applicability of temporal models including AD and SPREAD. It also suggests that Mahalanobis distance as applied in the error space instead of original input space amplifies the effect of weak temporal anomalies.

ii. PCA-AD does not perform well compared to FF-AD and SPREAD suggesting that explicit dimensionality reduction via PCA leads to loss of information related to anomalous signatures, whereas FF-AD and SPREAD are able to leverage the benefits of internal dimensionality reduction via the feedforward dimensionality reduction layer.

iii. As expected, Relevant-AD—leveraging the knowledge of relevant sensors—is a strong baseline. This highlights the fact that EncDec-AD performs well in low-dimensional cases such as the Relevant-AD scenario. In other words, poor performance of AD compared to Relevant-AD highlights that detecting anomalous signature is difficult when prior knowledge of relevant dimensions is not available—which is often the case in practice. However, for Pulverizer and GHL datasets, we observe that AD performs better than Relevant-AD because in these cases the effect of anomaly originating in a sensor is also visible in other correlated sensors making it easier to detect anomalies due to amplification of anomalous signature when considering more sensors together.

iv. SPREAD performs significantly better compared to other methods on most datasets (except Relevant-AD as discussed above). SPREAD performs better than or comparable to FF-AD highlighting the regularizing effect of sparse connections. Sparsity factors (Table 2) indicate sparse nature of connections in SPREAD compared to FF-AD. The sparsity factor is measured as the fraction of weights with absolute value <0.1 times the average of absolute weights.

v. Relevant-AD was applied on Turbomachinery dataset with the two relevant sensors R1 and R2 considered independently, and a significant drop in performance compared to model using both the relevant sensors together was observed as shown in Table 3. This suggests that capturing correlation (or dependence) between sensors is important for detecting anomalies.

The RNN based autoencoders for anomaly detection may yield sub-optimal performance in practice for multi-dimensional time series. To address this, the proposed SPREAD of the system 100 explicitly provisions for dimensionality reduction layer trained in an end-to-end manner along with the autoencoder and acts as a strong regularizer for multi-dimensional time series modeling. SPREAD works in an online manner which is desirable for streaming applications.

Experiments on a public dataset and two real-world datasets prove the efficacy of the proposed approach. Further, even though SPREAD uses dimensionality reduction internally, anomaly detection happens in the input feature space such that reconstruction error for each input dimension is accessible making the anomaly scores interpretable in practice. This proposed approach shall not be construed as a limiting scope for scenarios and/or examples described in the present disclosure and can be applicable to any multi-dimensional time series anomaly detection.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure, allows learning a robust non-linear temporal model of multivariate time series. Moreover, the embodiments herein capture relation between the multiple parameters at same time instance, i.e. dependencies and correlations between multiple dimensions or parameters at a given point in time. Further, the proposed approach captures temporal relations between multiple parameters over time, i.e. dependencies and correlations between multiple dimensions or variables in a multivariate time series over a period of time. Further, the proposed approach allows to learn a single neural network model that can cater to the above two capabilities in an end-to-end learning framework that is trainable via backpropagation.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method, comprising:
receiving, at an input layer, a multi-dimensional time series corresponding to a plurality of parameters of an entity;
obtaining, using a dimensionality reduction model, a reduced-dimensional time series from the multi-dimensional time series via an at least one feedforward layer, wherein connections between the input layer and the feedforward layer are sparse to access at least a portion of the plurality of parameters;
estimating, by using a recurrent neural network (RNN) encoder-decoder model, the multi-dimensional time series using the reduced-dimensional time series obtained by the dimensionality reduction model;
simultaneously learning, by using the estimated multi-dimensional time series, the dimensionality reduction model and the RNN encoder-decoder model to obtain a multi-layered sparse neural network, wherein the learning comprises training a sparse feedforward layer of the dimensionality reduction model and the RNN encoder-decoder model using a stochastic gradient descent, wherein a value of gradient of the sparse feedforward layer of the dimensionality reduction model is based on an element of a sparse weight matrix, wherein the sparse feedforward layer acts as a regularizer such that the reduced-dimensional time series in reduced dimensional space in a Rectified Linear Unit (ReLU) layer is forced to capture information to reconstruct the multi-dimensional time series, and wherein the RNN encoder-decoder model is trained as a temporal autoencoder on a normal time series and provides a reconstruction error and a corresponding anomaly score for an anomalous time series pattern;
computing, by using the multi-layered sparse neural network, a plurality of error vectors corresponding to at least one time instance of the multi-dimensional time series by performing a comparison of the multi-dimensional time series and the estimated multi-dimensional time series; and
generating at least one anomaly score based on the plurality of the error vectors to classify the at least one time instance in the multi-dimensional time series as anomalous or normal using a threshold learned based on a hold-out validation set while maximizing F-score, wherein the hold-out validation set comprises at least one normal time instance and at least one anomalous time instance of the multi-dimensional time series.

2. The processor-implemented method of claim 1, wherein each of a plurality of parameters in the reduced-dimensional time series is a non-linear function of a subset of a plurality of parameters of the multi-dimensional time series.

3. The processor-implemented method of claim 1, wherein the dimensionality reduction model comprises a plurality of feedforward layers with Least Absolute Shrinkage and Selection Operator (LASSO) sparsity constraint on a plurality of parameters of the plurality of feedforward layers.

4. The processor-implemented method of claim 1, further comprising:
   (a) classifying the at least one time instance in the multi-dimensional time series as anomalous if the anomaly score is greater than the threshold, or
   (b) classifying the at least one time instance in the multi-dimensional time series as normal if the anomaly score is less than or equal to the threshold.

5. A system comprising:
   a memory storing instructions; one or more communication interfaces; and
   one or more hardware processors coupled to the memory via the one or more communication interfaces, wherein the one or more hardware processors are configured by the instructions to:
   receive, at an input layer, a multi-dimensional time series corresponding to a plurality of parameters of an entity;
   obtain, using a dimensionality reduction model, a reduced-dimensional time series from the multi-dimensional time series via an at least one feedforward layer, wherein connections between the input layer and the feedforward layer are sparse to access at least a portion of the plurality of parameters;
   estimate, by using a recurrent neural network (RNN) encoder-decoder model, the multi-dimensional time series using the reduced-dimensional time series obtained by the dimensionality reduction model;
   simultaneously learn, by using the estimated multi-dimensional time series, the dimensionality reduction model and the RNN encoder-decoder model to obtain a multi-layered sparse neural network, wherein the learning comprises training a sparse feedforward layer of the dimensionality reduction model and the RNN encoder-decoder model using a stochastic gradient descent, wherein a value of gradient of the sparse feedforward layer of the dimensionality reduction model is based on an element of a sparse weight matrix, wherein the sparse feedforward layer acts as a regularizer such that the reduced-dimensional time series in reduced dimensional space in a Rectified Linear Unit (ReLU) layer is forced to capture information to reconstruct the multi-dimensional time series, and wherein the RNN encoder-decoder model is trained as a temporal autoencoder on a normal time series and provides a reconstruction error and a corresponding anomaly score for an anomalous time series pattern;
   compute, by using the multi-layered sparse neural network, a plurality of error vectors corresponding to at least one time instance of the multi-dimensional time series by performing a comparison of the multi-dimensional time series and the estimated multi-dimensional time series; and
   generate at least one anomaly score based on the plurality of the error vectors to classify the at least one time instance in the multi-dimensional time series as anomalous or normal using a threshold learned based on a hold-out validation set while maximizing F-score, wherein the hold-out validation set comprises at least one normal time instance and at least one anomalous time instance of the multi-dimensional time series.

6. The system of claim 5, wherein each of a plurality of parameters in the reduced-dimensional time series is a non-linear function of a subset of a plurality of parameters of the multi-dimensional time series.

7. The system of claim 5, wherein the dimensionality reduction model comprises a plurality of feedforward layers with Least Absolute Shrinkage and Selection Operator (LASSO) sparsity constraint on a plurality of parameters of the plurality of feedforward layers.

8. The system of claim 5, wherein the one or more hardware processors are further configured to:
   (a) classify the at least one time instance in the multi-dimensional time series as anomalous if the anomaly score is greater than the threshold, or
   (b) classify the at least one time instance in the multi-dimensional time series as normal if the anomaly score is less than or equal to the threshold.

9. One or more non-transitory machine readable information storage mediums comprising one or more instructions which when executed by one or more hardware processors cause:
   receiving, at an input layer, a multi-dimensional time series corresponding to a plurality of parameters of an entity;
   obtaining, using a dimensionality reduction model, a reduced-dimensional time series from the multi-dimensional time series via an at least one feedforward layer, wherein connections between the input layer and the feedforward layer are sparse to access at least a portion of the plurality of parameters;
   estimating, by using a recurrent neural network (RNN) encoder-decoder model, the multi-dimensional time series using the reduced-dimensional time series obtained by the dimensionality reduction model;
   simultaneously learning, by using the estimated multi-dimensional time series, the dimensionality reduction model and the RNN encoder-decoder model to obtain a multi-layered sparse neural network, wherein the learning comprises training a sparse feedforward layer of the dimensionality reduction model and the RNN encoder-decoder model using a stochastic gradient descent, wherein a value of gradient of the sparse feedforward layer of the dimensionality reduction model is based on an element of a sparse weight matrix, wherein the sparse feedforward layer acts as a regularizer such that the reduced-dimensional time series in reduced dimensional space in a Rectified Linear Unit (ReLU) layer is forced to capture information to reconstruct the multi-dimensional time series, and wherein the RNN encoder-decoder model is trained as a temporal autoencoder on a normal time series and provides a reconstruction error and a corresponding anomaly score for an anomalous time series pattern;
   computing, by using the multi-layered sparse neural network, a plurality of error vectors corresponding to at least one time instance of the multi-dimensional time series by performing a comparison of the multi-dimensional time series and the estimated multi-dimensional time series; and
   generating at least one anomaly score based on the plurality of the error vectors to classify the at least one time instance in the multi-dimensional time series as anomalous or normal using a threshold learned based on a hold-out validation set while maximizing F-score, wherein the hold-out validation set comprises at least one normal time instance and at least one anomalous time instance of the multi-dimensional time series.

10. The one or more non-transitory machine readable information storage mediums of claim 9, wherein each of a plurality of parameters in the reduced-dimensional time series is a non-linear function of a subset of a plurality of parameters of the multi-dimensional time series.

11. The one or more non-transitory machine readable information storage mediums of claim 9, wherein the dimensionality reduction model comprises a plurality of feedforward layers with Least Absolute Shrinkage and Selection Operator (LASSO) sparsity constraint on a plurality of parameters of the plurality of feedforward layers.

12. The one or more non-transitory machine readable information storage mediums of claim 9, further comprising:
   (a) classifying the at least one time instance in the multi-dimensional time series as anomalous if the anomaly score is greater than the threshold, or
   (b) classifying the at least one time instance in the multi-dimensional time series as normal if the anomaly score is less than or equal to the threshold.

\* \* \* \* \*